June 3, 1924.  1,496,066

A. J. MEYER

COMBINED LID FASTENER AND CARRYING HANDLE FOR JARS

Filed Feb. 26, 1923  2 Sheets—Sheet 1

Witnesses:

A. J. Meyer,
Inventor

Attorney

June 3, 1924.                                                   1,496,066
                          A. J. MEYER
         COMBINED LID FASTENER AND CARRYING HANDLE FOR JARS
                        Filed Feb. 26, 1923        2 Sheets-Sheet 2
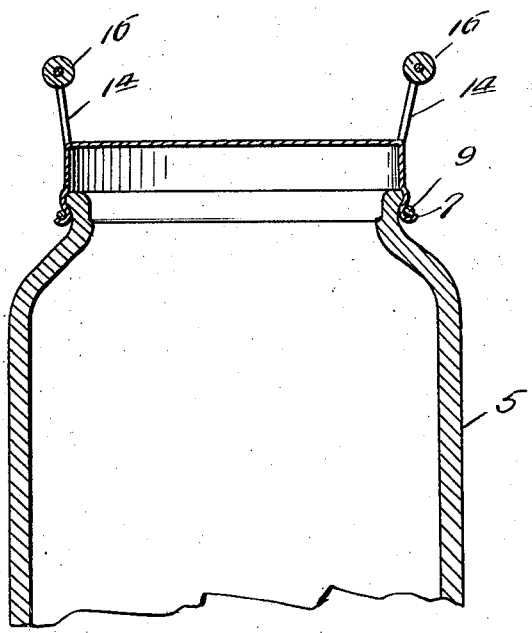
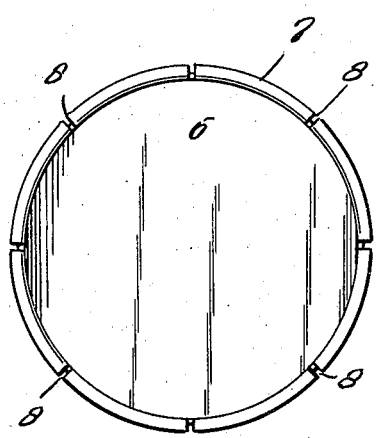

Patented June 3, 1924.

1,496,066

UNITED STATES PATENT OFFICE.

ALBERT J. MEYER, OF JOHNSON, NEBRASKA.

COMBINED LID FASTENER AND CARRYING HANDLE FOR JARS.

Application filed February 26, 1923. Serial No. 621,209.

*To all whom it may concern:*

Be it known that I, ALBERT J. MEYER, a citizen of the United States, residing at Johnson, in the county of Nemaha and State of Nebraska, have invented certain new and useful Improvements in Combined Lid Fasteners and Carrying Handles for Jars, of which the following is a specification.

The primary object of my invention resides in the provision of such a device that may be effectively employed for fastening jar lids in place, as well as for providing a means for carrying the jars from place to place, the invention being characterized by its simplicity of construction and ease of application.

In the drawings forming part of this application, like numerals of reference indicate similar parts in the several views, and wherein:

Figure 2 is a vertical transverse cross sectional view thereof.

Figure 4 is a bottom plan view of the specific form of jar lid in conjunction with which my article is employed.

Figure 1:
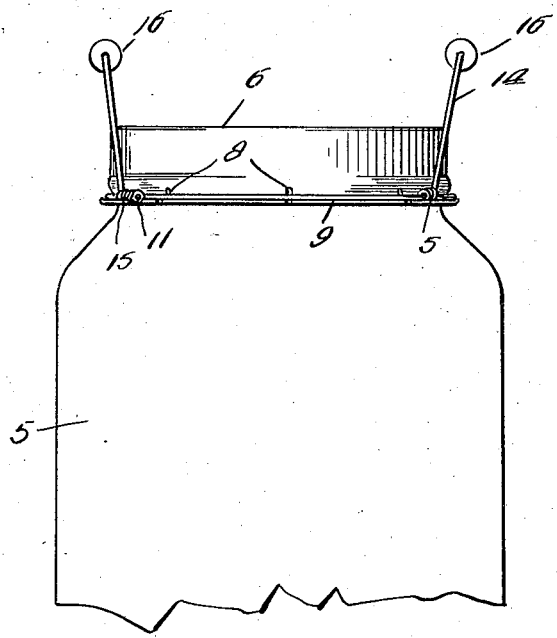
Figure 1 is an elevation of my combined lid fastener and carrying handle applied.
Figure 3:
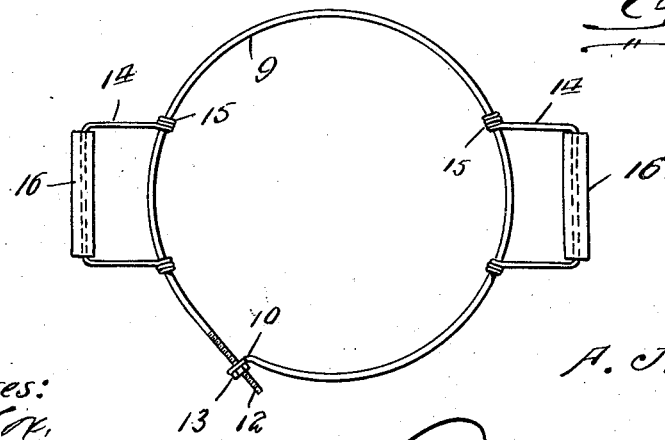
Figure 3 is a plan view of my article, per se.

5 designates a jar which is of a conventional type, which is adapted to receive thereon a metallic lid 6 of conventional type, the lower edge thereof being bent outwardly as at 7, and provided with spaced slots 8.

My article, per se, embodies a ring 9 of steel wire, one end thereof being bent outwardly as at 10, and flattened and formed with an opening 11. The opposite end of this wire ring 9 is screw threaded as at 12, which screw threaded end is adapted to be inserted within the said opening of the outwardly bent portion 10 at the opposite end of the ring, and adapted to be adjustably secured within this opening, through the instrumentality of a nut 13.

Upon the opposite sides of the said ring 9 are wire handles 14, the same consisting of a single length of wire bent into U shape as shown, the opposite ends thereof being coiled as at 15 around said wire ring 9. If desired, each of these wire handles 14 may have associated therewith wooden roller handles 16 for obvious purposes.

In the practical application of my device, the lid 6 is positioned upon the jar 5, after which the said ring 9 is engaged around the lower end of the lid and slightly above the said outwardly bent edge 7. It will at once be seen that by tightening up upon the nut 13, that the screw threaded end of the ring 9 will be drawn through the opening in the outwardly bent portion of the opposite end of the ring for consequently tightening this ring around the lid 6, for contracting this lid upon the jar, and whenever desirable, the said handles 14 may be employed for carrying the jar from place to place.

Although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters-Patent:

A combined lid fastener and carrying handle for jars including a single wire member having one end formed into a loop for slidably receiving the other end, said other end being formed with screw threads, a nut cooperating with said screw threads and adapted for engagement with the loop for drawing the threaded end of the wire member through the loop to vary the relative size of the ring formed by the member, a pair of handles mounted on said member and adapted for relative adjustment on the member for positioning at opposite sides thereof irrespective of the adjusted size of the member, whereby the member may be applied to the top of a bottle or jar and the nut operated to reduce the size of said member for compressing the cap on the jar securing the handle relative to the jar so that the same may be subsequently carried through the medium of the handle.

In testimony whereof I affix my signature.

ALBERT J. MEYER.